United States Patent [19]
Bhargava et al.

[11] Patent Number: 4,857,378
[45] Date of Patent: Aug. 15, 1989

[54] MOLDED SLANTED FRONT PANEL BEZEL FOR ELECTRONICS ENCLOSURE

[75] Inventors: Vikram Bhargava, Alpharetta; James R. Heberling, Lawrenceville, both of Ga.

[73] Assignee: Hayes Microcomputer Products, Inc., Norcross, Ga.

[21] Appl. No.: 202,073

[22] Filed: Jun. 3, 1988

[51] Int. Cl.[4] .............................................. B65D 1/24
[52] U.S. Cl. ..................................... 428/99; 312/7.1; 428/35.7; 428/36.92
[58] Field of Search ................. 312/7.1, 7.2; 428/35.7, 428/36.92, 99, 119, 120

[56] References Cited
U.S. PATENT DOCUMENTS

| | | | |
|---|---|---|---|
| 2,835,187 | 5/1958 | Schell | 428/101 X |
| 3,159,436 | 12/1964 | Davis | 312/7.1 X |
| 4,398,280 | 8/1983 | Ishigami et al. | 312/7.1 X |
| 4,430,370 | 2/1984 | Gallagher | 428/542.8 X |
| 4,535,902 | 8/1985 | Clark | 428/36.92 X |
| 4,675,223 | 6/1987 | Trummer | 428/53 |
| 4,699,341 | 10/1987 | Ponticelli | 312/7.1 X |
| 4,704,313 | 11/1987 | Maier | 428/45 X |
| 4,709,989 | 12/1987 | Machler | 156/89 X |
| 4,712,843 | 12/1987 | Castelli et al. | 312/7.2 X |
| 4,772,519 | 9/1988 | Irvine | 428/542.8 |

*Primary Examiner*—Henry F. Epstein
*Attorney, Agent, or Firm*—Jones, Askew & Lunsford

[57] ABSTRACT

A separately formed slanted front panel bezel manufactured using injection molding techniques. The interior slanted surface has a plurality of positioning tabs extending perpendicular thereto. An arch shaped screw receptacle extends above the surface, the geometry which allows the mold for same to be withdrawn in a conventional fashion. When the bezel is used in final assembly, a self-tapping screw bites a semi-circular section of the arch shaped protrusion.

14 Claims, 2 Drawing Sheets

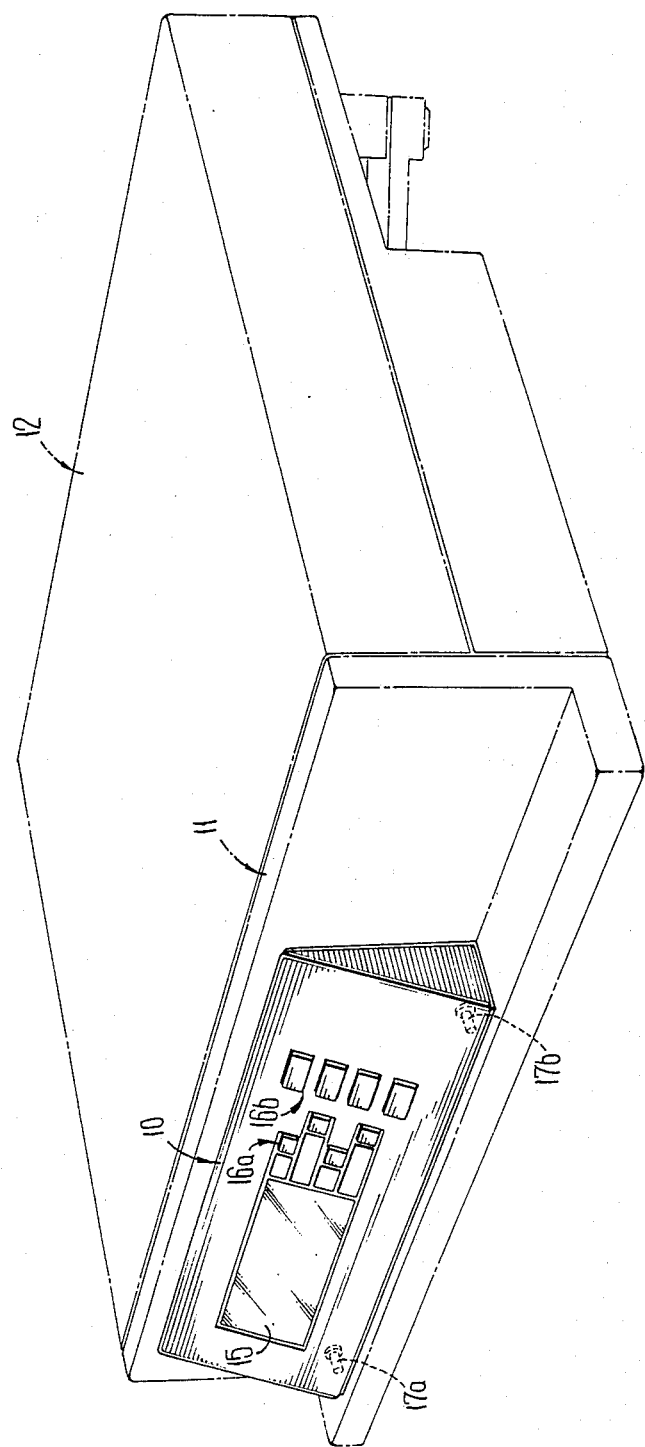

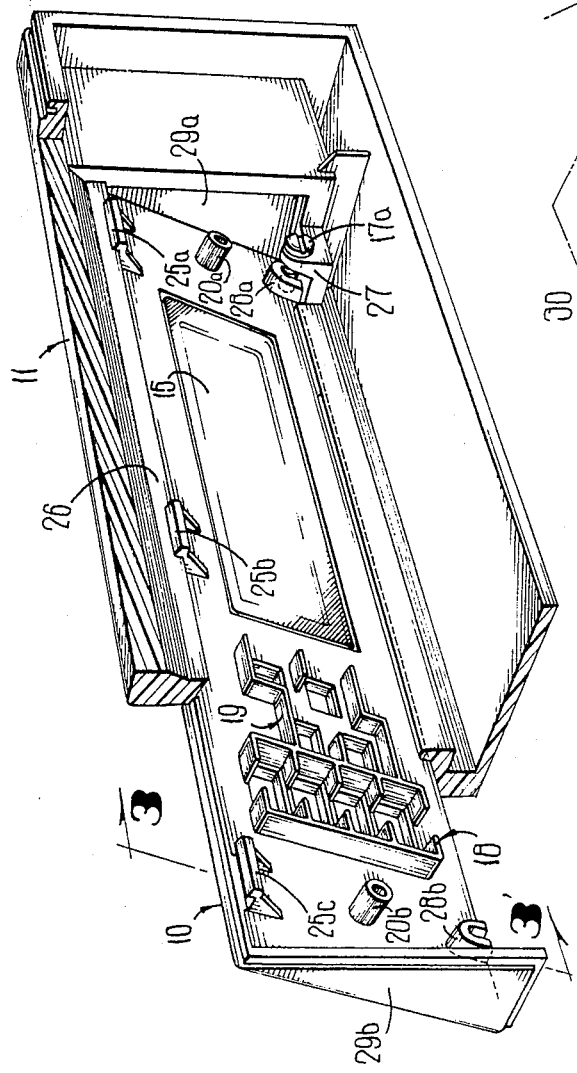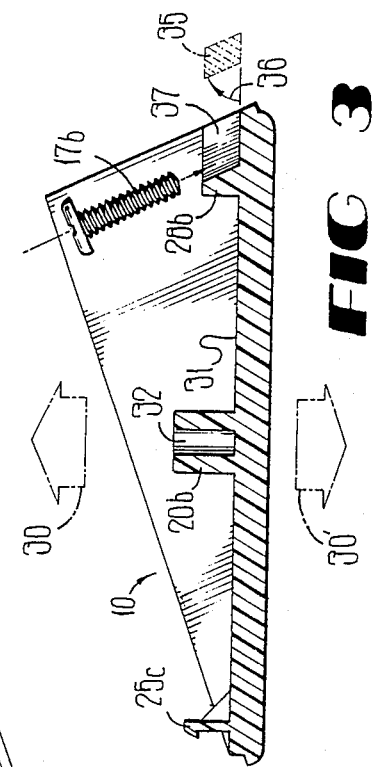

MOLDED SLANTED FRONT PANEL BEZEL FOR ELECTRONICS ENCLOSURE

TECHNICAL FIELD

The present invention relates to molded plastic enclosures for electronic devices and in particular is an improved apparatus for providing a slanted front panel bezel which may be practically molded using injection molding techniques.

BACKGROUND OF THE INVENTION

In recent years it has become more and more popular to employ the use of plastic enclosures for electronic devices, including computer peripherals such as modems. It is sometimes desirable, from both an aesthetic point of view and a functional point of view with respect to the angular disposition of displays, to have a slanted front panel bezel provided as part of an enclosure.

Well known limitations in the art of injection molding require that molded parts be constructed so that all parts of the resulting piece are aligned such that two mold halves may be designed to mold all the parts and that these mold halves may be withdrawn in a co-linear fashion away from the finished piece. This places certain limitations on the geometry of structures which may be made using injection molding techniques.

In the past, the construction of a molded plastic enclosure with a slanted front portion has normally been accomplished by molding the entire assembly as a single piece. This, naturally, leads to the result that the slanted and non-slanted portions of the front panel must be constructed in the same type of plastic. It is sometimes desirable to provide color differentiation between the slanted front portion and the other portions of the cabinet. To accomplish this result in the prior art, it has been necessary to undergo the separate step of painting the slanted portion.

Also, in some electronics assemblies, it is desirable to have separate electronic components, particularly self-contained display and keyboard devices, located in the slanted portion. Since it is normally necessary to securely mount a display device to the front panel, this leads to difficulties in assembly of such devices when the front panel portion is made of unitary construction with another significant portion of the cabinet.

The situation which gave rise to the need for the present invention was a desire to have a front panel bezel for a sophisticated modem which met all of the following criteria. First, it was desired that the front panel bezel be slanted with respect to the balance of the front portion of the equipment enclosure. Secondly, it is highly desired to provide a color differentiation between the slanted front panel bezel and the balance of the enclosure.

Additionally, the front panel in the device which gave rise to the present invention was one containing a liquid crystal display in a keyboard subassembly. There is a need to mount both the LCD display and the keyboard very securely to the front panel bezel. It was therefore desired to provide an arrangement where this subassembly could be made and ultimately connected to the electronics within the device via a ribbon cable or similar connector. Naturally, it was desired to avoid the costly step of painting or providing some other separate step for external application of a different color.

From the foregoing, the inventors were faced with the need for a slanted front panel bezel structure which could be molded separately from the balance of the equipment enclosure in question. This would allow the problem of color differentiation to become trivial since different color plastic could be used for the two parts. It was further desired to have such a separate piece which could have a display and keyboard subassembly securely attached thereto and have the entire subassembly joined, at a later point in the production process, with the rest of the apparatus.

However, there was no apparently practical way to meet all of these goals and still provide a front panel bezel which could be securely fastened to the balance of the equipment enclosure, and at the same time could be unfastened for replacement or repair at a later date. Naturally, if gluing with some form of permanent cement, such as epoxy, were an option, the problem of assembly would become trivial, albeit messy. However, there was a significant need for providing the combination of enclosure components which could be replaceable. Once such need rises from the obvious possibility that some portion of the apparatus will fail after final assembly. If a solution such as permanent gluing were adopted, the failure of a keyboard or display component would lead to destruction of the entire cabinet. It was to overcome these problems that the present inventors made the present invention.

SUMMARY OF THE INVENTION

The present invention overcomes these problems by providing an elegant solution to the central problem which arose from the above recited confluence of needs. In particular, if there was a dependable way to secure a slanted front panel bezel to the balance of the enclosure so that same would remain properly assembled, yet could be selectively disassembled if same were ever needed, then all of the other goals could be accomplished. The preferred embodiment of the present invention was one which required a number of retaining and positioning tabs to be provided perpendicular to the interior surface of the slanted bezel. The primary purpose of these is for positioning elements of a membrane keyboard and properly positioning the display device. This, in turn, led to a requirement that the molds for the front panel bezel be constructed so that same may be withdrawn perpendicular to the slanted surface thereof.

Therefore, as noted above, the central problem was how to make a molded piece which could meet all of these requirements. The obvious prior art solution to the problem is to provide relatively thick areas in the molded plastic and undergo the trouble and expense of a separate step of drilling screw holes into these areas. In addition, any protrusion at right angles to the main wall which is more than one-half the thickness of the wall will leave a visible sink mark on the wall, which generally reduces the visible appearance of the product. The present invention eliminates the need for this step in this environment by providing an arch shaped segment in the molded plastic material for receiving a self tapping screw. The present invention, by reducing the amount of plastic required for the protrusion, also reduces or eliminates the sink mark, thus improving the appearance of the finished product. Along the upper edges of the bezel, molded tabs or fingers are provided to secure the top edge to the balance of the front panel. The arch shaped receptacles for screws are disposed along the bottom half.

In one sense, these may be thought of as "half holes" for a screw. When this arrangement was tried, it was discovered that providing plastic material around substantially 180 degrees of the periphery of the screw, rather than the customary 360 degrees, was sufficient to allow screws to obtain a sufficient bite on the lower portion of the front panel bezel that proper assembly could indeed be made. Thus, the present invention comprises a slanted front panel bezel in which arch shaped areas may be molded using injection molds which are drawn perpendicular to the slanted surface of the bezel.

BRIEF DESCRIPTION OF THE DRAWINGS

FIG. 1 is a pictorial view of the preferred embodiment of the present invention in its environment on the front panel of an equipment enclosure.

FIG. 2 is a rear section view showing the preferred embodiment installed on the enclosure of FIG. 1.

FIG. 3 is a section view taken along line 33' shown in FIG. 2.

DETAILED DESCRIPTION

In FIG. 1, a front panel bezel 10 of the preferred embodiment is shown mounted on the front panel 11 of an equipment enclosure 12. As illustrated by the shading in FIG. 1, front panel 10 is molded from a different color plastic than the molding of front panel 11. The bezel includes a plastic window shown at 15 which covers a liquid crystal display element in the environment of the preferred embodiment. The environment in which the preferred embodiment of the present invention was designed was that of a 9600 bit per second full duplex modem implementing CCITT Recommendation V.32. The slanted front panel includes two 4-key arrangements in a keyboard generally shown at 16a and 16b. A pair of screws 17a and 17b shown in phantom in FIG. 1 are used to hold the bezel to the panel 11.

Turning next to FIG. 2, a rear partially cut away view of the bezel installed on front panel 11 is shown. Therein it may be seen that a plurality of elevated positioning tabs 18 are provided to hold membrane keys of keyboard array 16b (FIG. 1) in place. A second plurality of elevated positioning tabs is shown at 19 for holding key array 16a in place. A pair of hollow standoffs 20a and 20b are located at opposite distal ends of the bezel panel 10. These standoffs include hollow central portions for receiving self-tapping screws which are used to mount a circuit board for carrying the circuitry of an LCD display to fit in window 15, and the circuit for handling inputs from keys 16 shown in FIG. 1.

A plurality of mounting tabs or fingers 25a through 25c is shown along the top edge of the bezel and are used to grip interior top edge 26 of the front panel 11. A mounting hole on an elevated tab is shown as 27 in FIG. 2. This tab is part of the molded portion of front panel 11 and provides a surface against which the head of screw 17a can operate in order to secure bezel 10 to the front panel. Naturally, a second one of the elevated tabs is used at the other end of the opening for receiving the bezel in the portion of the panel which is broken away in FIG. 2.

The main point of the present invention may be appreciated from viewing FIGS. 2 and 3 concurrently. Arcuate screw receiving structures shown as 28a and 28b are provided as a molded portion of the panel. The problem presented to the inventors of the present invention is as follows. Due to limitations on the molding process, and practicalities of assembly using screw drivers, it was necessary for screws 17 to pass through the holes on elevated tabs 27 in the main front panel along a line parallel to the bottom of the equipment enclosure. In other words, the screws needed to be insertable horizontally. However, due to the need for vertical elevated structures with respect to the plane of the rear of slanted bezel 10, it was not practical to mold a screw hole similar to the screw holes in elevated mounting posts 20a and 20b. The plain reason for this is that the circuit board to be attached to posts 20a and 20b is intended to lie in a plane parallel to the slanted surface of bezel 10. However, the screws passing through elevated tabs 27 needed to form an acute angle with the interior surface of bezel 10. This is illustrated in particular in FIG. 3.

The ends of the slanted bezel are terminated at triangular side panels 29a and 29b. Since these structures are vertical with respect to the plane of the slanted bezel, molding these presents no particular problems. Viewing the section view of FIG. 3, it will be apparent to those skilled in the art that construction of bezel 10 using injection molding techniques requires that the mold halves be arranged so that they be withdrawn from the finished product in the directions of arrows of 30 and 30'. This requires that no structures be present which form angles with the plane of surface 31 of the bezel which are less than 90 degrees. The screw hole 32 on mounting post 20b is formed from a portion of the mold which may be withdrawn in the direction of arrow 30. However, to provide a conventional complete screw hole for receiving screw 17b, it would have been necessary to have included an additional portion of plastic, shown in phantom at 35 out to the right hand side of the bezel, which formed an acute angle with the plane of surface 31. Such an angle is represented by arrow 36 in the drawing. As noted hereinabove, accomplishment of this in a conventional fashion would have required that a solid molded piece be provided at 28b and subsequently drilled in a separate machining process, increasing the complexity and cost of the process.

As may be seen from the concurrent inspection of FIGS. 2 and 3, screw receptacles 28a and 28b are arch shaped. Since their open ends, shown at 37 in FIG. 3, presents no molding problem, it is possible to make this entire structure in a conventional injection molding process.

The inventors of the present invention have discovered that the semi-circular surface of screw receptacles 28, which contacts approximately 180 degrees of the surface of screw 17 when inserted, is sufficient to give a good dependable hold and thereby provide the effect of an injection molded screw hole at an acute angle with respect to the plane of the surface of the molded structure as shown at 31. It will therefore be appreciated that the arch shaped apparatus includes portions protruding above the plane of surface 31, none of which form an angle with the nearest adjacent portion of surface 31 which is less than 90 degrees. This is another way of stating the fact that there are no overhanging portions of a molded piece which would prevent withdrawal of the mold halves after the product is formed.

From the foregoing description of the present invention, other embodiments of same will suggest themselves to those skilled in the art and therefore the invention is to be limited only by the claims below.

We claim:

1. An injection molded member having a substantially planar surface and also having a plurality of positioning tab elements extending perpendicular to said surface, and being configured for engaging the opening of an enclosure, the improvement comprising:

a protrusion extending perpendicular to said surface, said protrusion defining an arch shaped vacant area therein, said vacant area having a side wall surface portion which forms no angle less than 90 degrees, between such side wall surface portion, and the nearest adjacent portion of said planar surface, said vacant area configured for accepting an assembly screw therein.

2. The member as claimed in claim 1, wherein said vacant area is configured for accepting an elongate assembly screw having a longitudinal axis such that said longitudinal axis is at an acute angle from the normal axis of said planar surface of said member.

3. A panel assembly for positioning within a panel-shaped opening of an enclosure, comprising:

an injection molded member having a substantially planar surface, and defining a protrusion extending substantially perpendicular to said surface, said protrusion defining an arch shaped vacant area therein at least partially defined by an arcuate side wall surface portion which forms no angle less than 90 degrees between said side wall surface portion and said planar surface; and an assembly screw having a longitudinal axis, a headed end and an engaging end, said engaging end configured to fit within said arch shaped vacant area such that said assembly screw engages said arcuate side wall surface portion, and said assembly screw provides physical connection between said injection molded member and said enclosure.

4. The member as claimed in claim 3, wherein said longitudinal axis of said assembly screw is at an acute angle from the normal axis of said planar surface of said member.

5. The member as claimed in claim 4, wherein said assembly screw engages said side wall surface portion by threaded engagement.

6. The member as claimed in claim 4, wherein said assembly screw is threaded and has a substantially circular cross section, wherein said arcuate side wall surface portion is substantially aligned with and conforms substantially to the periphery of said assembly screw, and wherein less than half of said assembly screw periphery is in threaded engagement with said arcuate side wall surface portion.

7. The member as claimed in claim 3, wherein said assembly screw engages said side wall surface portion by threaded engagement.

8. The member as claimed in claim 3, wherein said assembly screw is threaded and has a substantially circular cross section, wherein said arcuate side wall surface portion is substantially aligned with and conforms substantially to the periphery of said assembly screw, and wherein less than half of said assembly screw periphery is in threaded engagement with said arcuate side wall surface portion.

9. A panel assembly for positioning within a panel-shaped opening of an enclosure, comprising:

an injection molded member including a finger means for engaging said enclosure and preventing movement in a first direction of said panel assembly relative to said enclosure, said injection molded member defining a substantially planar surface, said injection molded member also defining a protrusion extending substantially perpendicular to said surface, said protrusion defining an arch shaped vacant area therein, said vacant area having an arcuate side wall portion which forms no angle less than 90 degrees between said side wall surface portion and said planar surface; and an assembly screw having a longitudinal axis, a headed end and an engaging end, said engaging end configured to fit within said arch shaped vacant area such that said assembly screw engages said arcuate side wall surface portion, and prevents movement of said injection molded member in a second direction relative to said enclosure, said second direction being substantially opposite to said first direction.

10. The member as claimed in claim 9, wherein said said longitudinal axis of said assembly screw is at an acute angle from the normal axis of said planar surface of said member.

11. The member as claimed in claim 9, wherein said assembly screw engages said side wall surface portion by threaded engagement.

12. The member as claimed in claim 9, wherein said assembly screw is threaded and has a substantially circular cross section, wherein said arcuate side wall surface portion is substantially aligned with and conforms substantially to the periphery of said assembly screw, and wherein less than half of said assembly screw periphery is in threaded engagement with said arcuate side wall surface portion.

13. The member as claimed in claim 10, wherein said assembly screw engages said side wall surface portion by threaded engagement.

14. The member as claimed in claim 10, wherein said assembly screw is threaded and has a substantially circular cross section, wherein said arcuate side wall surface portion is substantially aligned with and conforms substantially to the periphery of said assembly screw, and wherein less than half of said assembly screw periphery is in threaded engagement with said arcuate side wall surface portion.

* * * * *